(12) United States Patent
Gretz

(10) Patent No.: US 7,485,805 B1
(45) Date of Patent: Feb. 3, 2009

(54) TWO-GANG RECESSED ELECTRICAL BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 22 days.

(21) Appl. No.: 11/903,721

(22) Filed: Sep. 24, 2007

Related U.S. Application Data

(63) Continuation-in-part of application No. 11/655,299, filed on Jan. 19, 2007, now Pat. No. 7,294,781, which is a continuation-in-part of application No. 11/356,590, filed on Feb. 16, 2006, now Pat. No. 7,166,801, which is a continuation-in-part of application No. 11/264,857, filed on Nov. 2, 2005, now Pat. No. 7,045,713, which is a continuation-in-part of application No. 11/246,985, filed on Oct. 7, 2005, now Pat. No. 7,064,271, which is a continuation-in-part of application No. 11/185,256, filed on Jul. 20, 2005, now Pat. No. 7,115,820, which is a continuation-in-part of application No. 11/102,392, filed on Apr. 8, 2005, now Pat. No. 7,151,219, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H02G 3/08* (2006.01)

(52) U.S. Cl. .............. 174/50; 174/53; 174/58; 174/64; 174/135; 312/348.3; 439/535; 248/906

(58) Field of Classification Search .............. 174/50, 174/53, 54, 58, 61, 64, 135; 220/3.2, 3.3, 220/3.5, 3.6, 3.7, 3.8, 3.94, 4.02, 529, 530, 220/545; 248/906; 439/535; 312/348.3
See application file for complete search history.

(56) References Cited

U.S. PATENT DOCUMENTS

| | | | |
|---|---|---|---|
| 4,059,327 A | 11/1977 | Vann | |
| 4,936,794 A | 6/1990 | Shaw et al. | |
| 5,486,650 A | 1/1996 | Yetter | |
| 5,938,064 A * | 8/1999 | Smith, Jr. | 220/475 |
| 5,950,834 A * | 9/1999 | Woodnorth et al. | 206/541 |
| 6,414,241 B1 | 7/2002 | O'Donnell | |

(Continued)

*Primary Examiner*—Dhiru R Patel

(57) ABSTRACT

A two-gang recessed electrical box assembly for recessing a plurality of high or low voltage electrical components within a wall. The recessed electrical box assembly includes an electrical box with an electrical enclosure therein and a trim plate. The electrical enclosure can accommodate two high voltage components or two low voltage components or an optional voltage separator can be installed to divide the enclosure and enable the mounting of both a high voltage and low voltage component in the resultant subdivided enclosures. The trim plate includes a laterally extending flange and a peripheral flange that is received within the sidewalls of the electrical box. Alignment tabs are provided on the sidewalls of the electrical box to enable easy alignment against a stud. A mounting arrangement is provided on the outer sidewalls of the electrical box for securing the two-gang electrical box assembly to a stud or similar support.

15 Claims, 14 Drawing Sheets

U.S. PATENT DOCUMENTS 6,576,835 B1 * 6/2003 Ford et al. .................... 174/50
6,871,921 B2 * 3/2005 Ernst ....................... 312/348.3
7,044,318 B2 5/2006 Gates, II

* cited by examiner

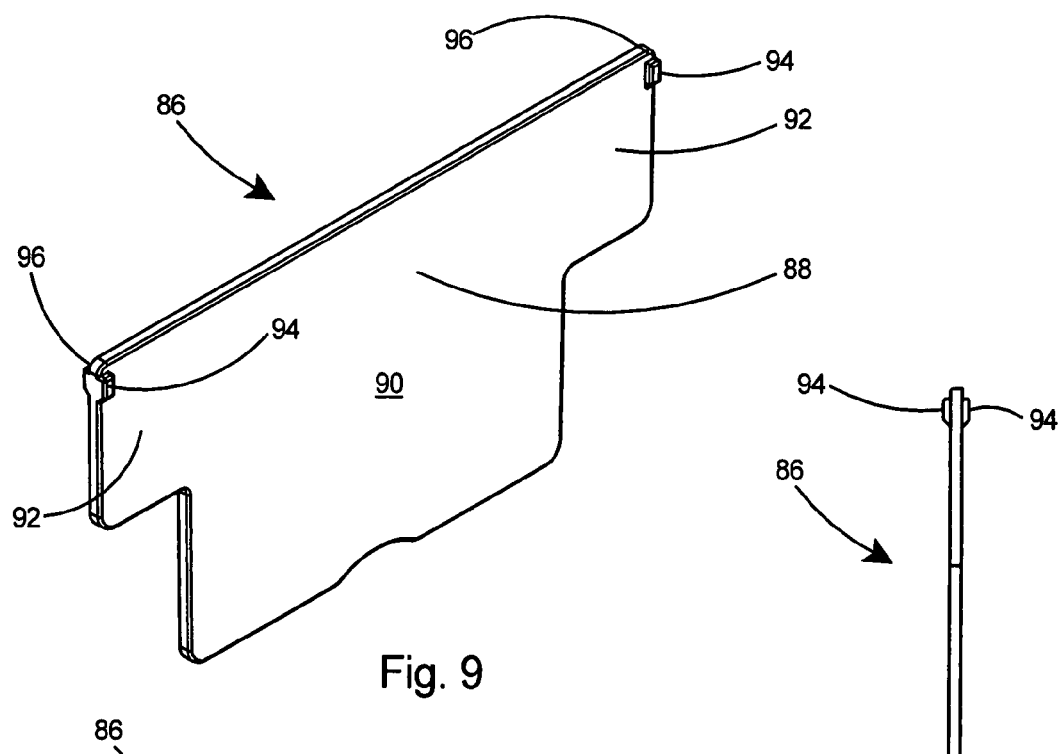
Fig. 9
Fig. 11
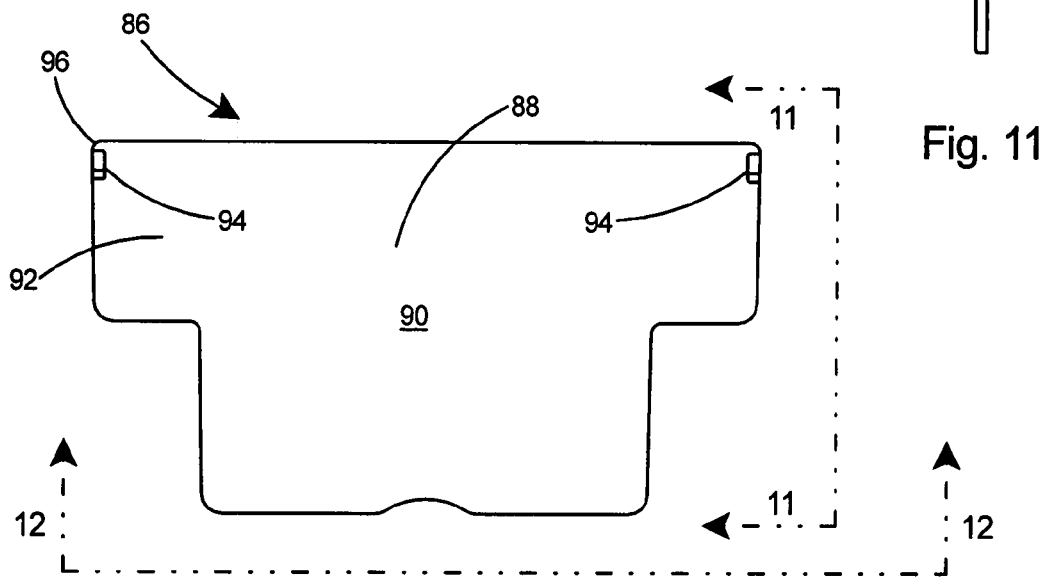
Fig. 10
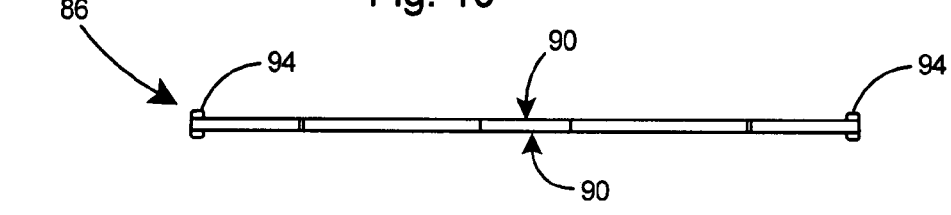
Fig. 12

TWO-GANG RECESSED ELECTRICAL BOX ASSEMBLY

This application is a Continuation-In-Part of U.S. patent application Ser. No. 11/655,299 filed Jan. 19, 2007 and now U.S. Pat. No. 7,294,781, which is a Continuation-In-Part of U.S. patent application Ser. No. 11/356,590 filed Feb. 16, 2006 and now U.S. Pat. No. 7,166,801, which is a Continuation-In-Part of U.S. patent application Ser. No. 11/264,857, filed Nov. 2, 2005 and now U.S. Pat. No. 7,045,713, which is a Continuation-In-Part of U.S. patent application Ser. No. 11/246,985, filed Oct. 7, 2005 and now U.S. Pat. No. 7,064,271, which is a Continuation-In-Part of U.S. patent application Ser. No. 11/185,256, filed Jul. 20, 2005 and now U.S. Pat. No. 7,115,820, which is a Continuation-In-Part of U.S. patent application Ser. No. 11/102,392, filed Apr. 8, 2005 and now U.S. Pat. No. 7,151,219, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and now U.S. Pat. No. 7,005,578, which is a Continuation-In-Part of U.S. patent application Ser. No. 10/863,942 filed Jun. 9, 2004 and now U.S. Pat. No. 6,956,171, all of which are commonly owned by the assignee of the present invention and the entire contents of which are incorporated herein by reference.

FIELD OF THE INVENTION

This invention relates to assemblies for the mounting of electrical devices and specifically to a recessed electrical box assembly that includes an electrical box portion and a trim plate for recessing and protecting an electrical device therein.

BACKGROUND OF THE INVENTION

Recessed electrical boxes for retrofitting on finished walls or for use in new construction were disclosed in U.S. Pat. Nos. 6,965,078, 6,956,171, 7,005,578, 7,045,713, 7,064,271, 7,115,820, and 7,151,820, 7,166,801 and in co-pending U.S. application Ser. No. 11/655,299, all of which are commonly owned by the assignee of the present invention and the entire contents of which are incorporated herein by reference.

The recessed electrical boxes disclosed in the aforementioned patents and applications comprised an electrical box having an inner enclosure for housing an electrical device and an outer enclosure for recessing the inner enclosure well within a wall. The recessed electrical box including the inner enclosure and outer enclosure were either integrally formed in one piece or provided in two pieces each formed of the same material of construction.

Although a recessed electrical box of the type described in the aforementioned disclosures provided an adequate means for recessing an electrical device substantially within the wall of a structure, they were directed primarily to recessing a single high voltage electrical device. Although the aforementioned patents and patent applications provide an apparatus for recessing a high voltage electrical device on the exterior of a structure, there is also a need for recessing multiple electrical devices, including both high and low voltage components, on the wall of a structure.

Accordingly, the present invention provides a two-gang recessed electrical box assembly that includes a first portion that comprises an electrical box for recessing two electrical components within a wall. The two-gang recessed electrical box assembly can accommodate two high voltage components, two low voltage components, or one high voltage component and one low voltage component. A second portion of the recessed assembly includes a trim plate for covering the electrical box and a portion of the interior wall surrounding the box to obscure that portion of the wall surrounding the electrical box. The two-gang recessed electrical box assembly provides an outer enclosed area for shielding and protecting the plug ends of electrical cords or similar cables connected to the electrical components housing in the assembly.

SUMMARY OF THE INVENTION

The invention is a two-gang recessed electrical box assembly for recessing two electrical components within a wall. Either high or low voltage components can be installed within the assembly. The recessed electrical box assembly includes an electrical box and a trim plate. The electrical box includes sidewalls and a back wall defining an enclosure therein. Two high voltage components or two low voltage components can be installed within the enclosure, or an optional voltage separator can be installed to divide the enclosure and to enable the mounting of both a high voltage and low voltage component in the resultant subdivided enclosures. The trim plate includes a laterally extending flange and a rearward-extending collar that is received within the sidewalls of the electrical box. Alignment tabs are provided on the sidewalls of the electrical box to enable easy alignment against a stud in either a new work or retrofit situation. Nailers are provided on the outer sidewalls of the electrical box for securing the two-gang electrical box assembly to a stud or similar support. The nailers are angled away from the sidewalls and toward the front of the electrical box and include captive fasteners to simplify the installation of the recessed electrical box assembly to a wall.

OBJECTS AND ADVANTAGES

A first object of the two-gang recessed electrical box assembly of the present invention is to provide a recessed electrical box that can accommodate both high and low voltage electrical components within the same assembly.

A second object of the two-gang recessed electrical box assembly of the present invention is to provide an electrical box assembly that positions one or more electrical devices behind the wall surface, thereby recessing the electrical devices and enabling cabinets, wall clocks, appliances, and the like to be positioned close to the wall without interference or obstruction from the electrical device.

A third object is to provide a two-gang recessed electrical box assembly that shields all of the installed electrical devices and any electrical cords plugged therein from splashing water, grease, impacts from vacuum cleaners, or other household hazards.

A further object is to provide a recessed electrical box assembly that provides a recessed area or cavity within the wall to hold the plug ends of electrical cords while they are in use, thereby recessing the plug ends away from the wall and from interference with the appliance or device they are providing electrical feed to.

Another object of the present invention is to provide a two-piece recessed electrical box assembly that includes nailers with captive fasteners for easing the installation task. The captive fasteners are angled outwards with respect to the sidewalls of the box and angled toward the front of the box to make them more easily accessible to an installer in a retrofit situation.

These and other objects and advantages of the present invention will be better understood by reading the following description along with reference to the drawings.

DESCRIPTION OF THE DRAWINGS

FIG. 9 is a perspective view of a voltage separator that may be used to divide the electrical box enclosure of the present invention into separate high and low voltage compartments.

FIG. 10 is a front elevation view of the voltage separator of FIG. 9.

FIG. 11 is an end view of the voltage separator as viewed from line 11-11 of FIG. 10.

FIG. 12 is a bottom view of the voltage separator as viewed from line 12-12 of FIG. 10.

TABLE OF NOMENCLATURE

Figure 1:
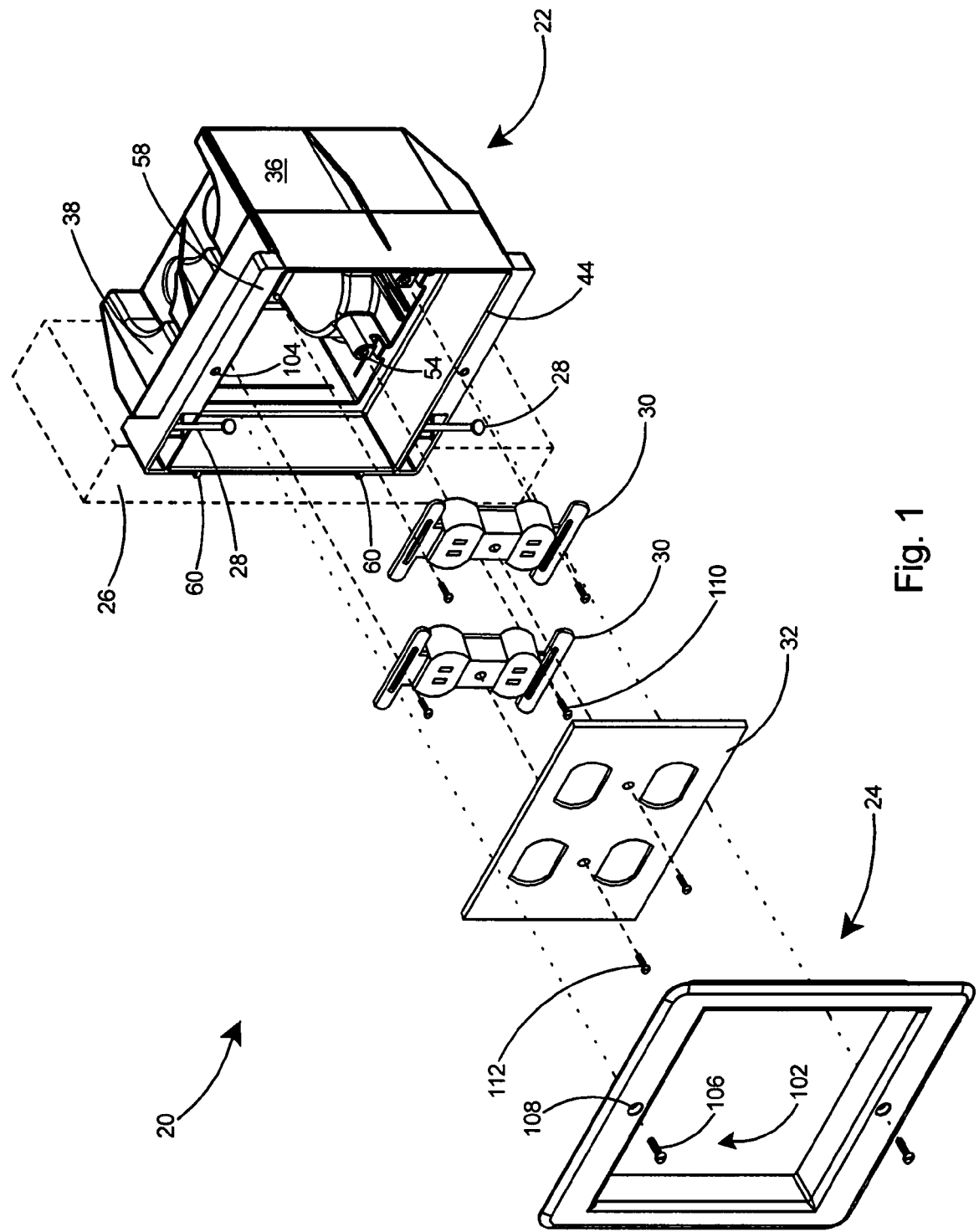
FIG. 1 is an exploded perspective view of a preferred embodiment of the two-gang recessed electrical box assembly according to the present invention along with two duplex outlets and a complementary faceplate.

The following is a listing of part numbers used in the drawings along with a brief description:

| Part Number | Description |
| --- | --- |
| 20 | two-gang recessed electrical box assembly |
| 22 | electrical box |
| 24 | trim plate |
| 26 | stud |
| 28 | captive fastener |
| 30 | duplex outlet |
| 32 | faceplate |
| 34 | open front of electrical box |
| 36 | pair of opposing vertical sidewalls |
| 38 | pair of opposing horizontal sidewalls |
| 40 | rear wall |
| 42 | electrical enclosure |
| 44 | front edge |
| 46 | inner surface of sidewall |
| 48 | outer surface of sidewall |
| 50 | forward portion of sidewall |
| 52 | rearward portion of sidewall |
| 54 | connection point |
| 56 | rib |
| 58 | flange |
| 60 | alignment tab |
| 62 | forward edge of rib |
| 64 | rear edge of alignment tab |
| 66 | recessed area |
| 68 | recessed wall |
| 70 | boss for connection point |
| 72 | lateral wall of electrical box |
| 74 | mounting arrangement |
| 76 | fastener retaining boss |
| 78 | axis |
| 80 | dividing arrangement |
| 82 | channel |
| 84 | smaller electrical enclosure |
| 86 | panel |
| 88 | main portion of panel |
| 90 | side of panel |
| 92 | wing |
| 94 | tab |
| 96 | outer corner |
| 98 | peripheral sidewall of trim plate |
| 100 | flange of trim plate |
| 102 | fastening arrangement |
| 104 | bore in flange of electrical box |
| 106 | trim plate fastener |
| 108 | aperture in trim plate |
| 109 | sheet rock |
| 110 | electrical component fastener |
| 112 | faceplate fastener |
| 114 | wall |
| 116 | recessed enclosure |
| 117 | plug end of electrical cord |
| 118 | GFCI outlet |
| 119 | low voltage electrical component |
| 120 | faceplate |
| 122 | push-in connector |
| 124 | knockout |
| D1 | offset of connection point boss from front edge |
| $\theta_1$ | angle of fastener with respect to front edge of sidewall |

DETAILED DESCRIPTION OF THE INVENTION

With reference to FIG. 1, a preferred embodiment is shown of the present invention, which is a two-gang recessed electrical box assembly 20 including an electrical box 22 and a trim plate 24. The electrical box 22 of the recessed electrical box assembly 20 is depicted in alignment against a stud 26 to which it will be secured by captive fasteners 28. Two conventional duplex outlets 30 and a complementary conventional faceplate 32 are shown in alignment with the electrical box 22 to be connected thereto.

Figure 2:
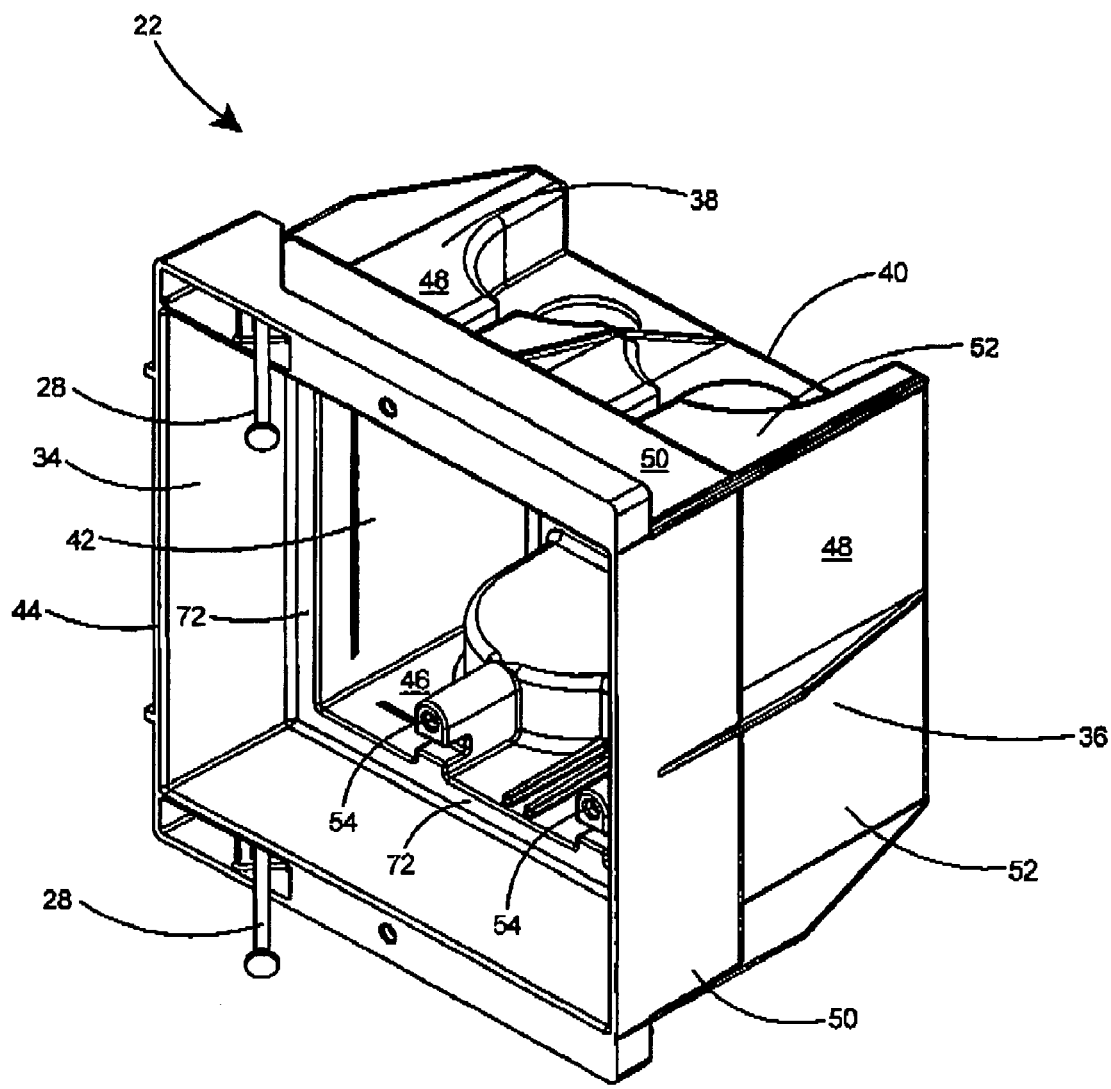
FIG. 2 is a perspective view of the electrical box portion of the two-gang recessed electrical box assembly of FIG. 1.
Figure 3:
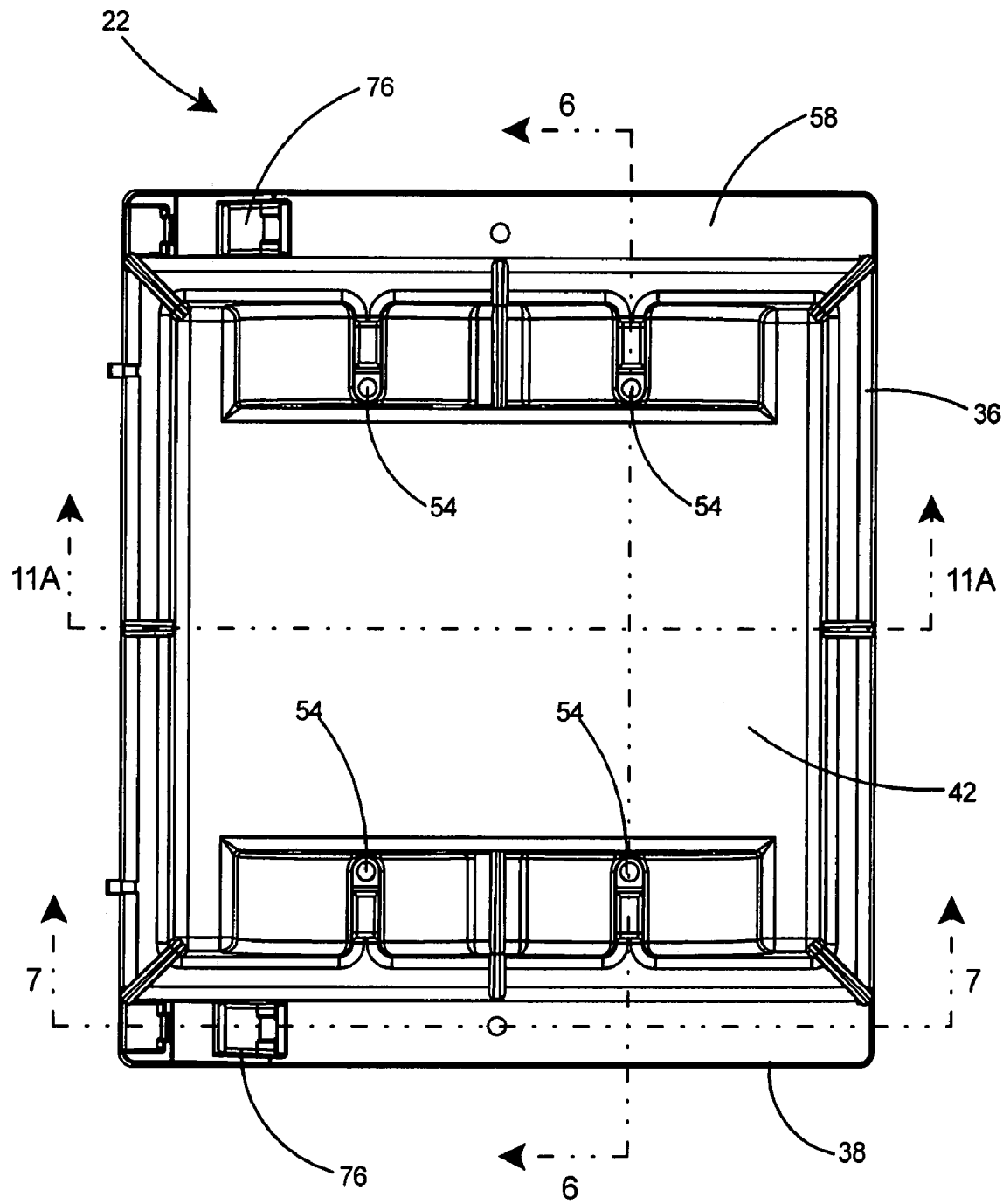
FIG. 3 is a front view of the electrical box of FIG. 2.

Referring to FIG. 2, the electrical box 22 includes an open front 34, two pairs of opposing sidewalls including a pair of opposing vertical sidewalls 36 and a pair of opposing horizontal sidewalls 38, and a rear wall 40 defining an electrical enclosure 42 therein. The sidewalls 36 and 38 include a front edge 44, inner surfaces 46, and outer surfaces 48. The sidewalls 36, 38 include a forward portion 50 and a rearward portion 52 with the forward portion 50 of the sidewalls extending laterally a greater distance than the rearward portion 52 of the vertical sidewalls 36. As shown in FIG. 3, the electrical box 22 further includes connection points 54 for securing one or more electrical devices (not shown) in the electrical enclosure 42.

Figure 4:
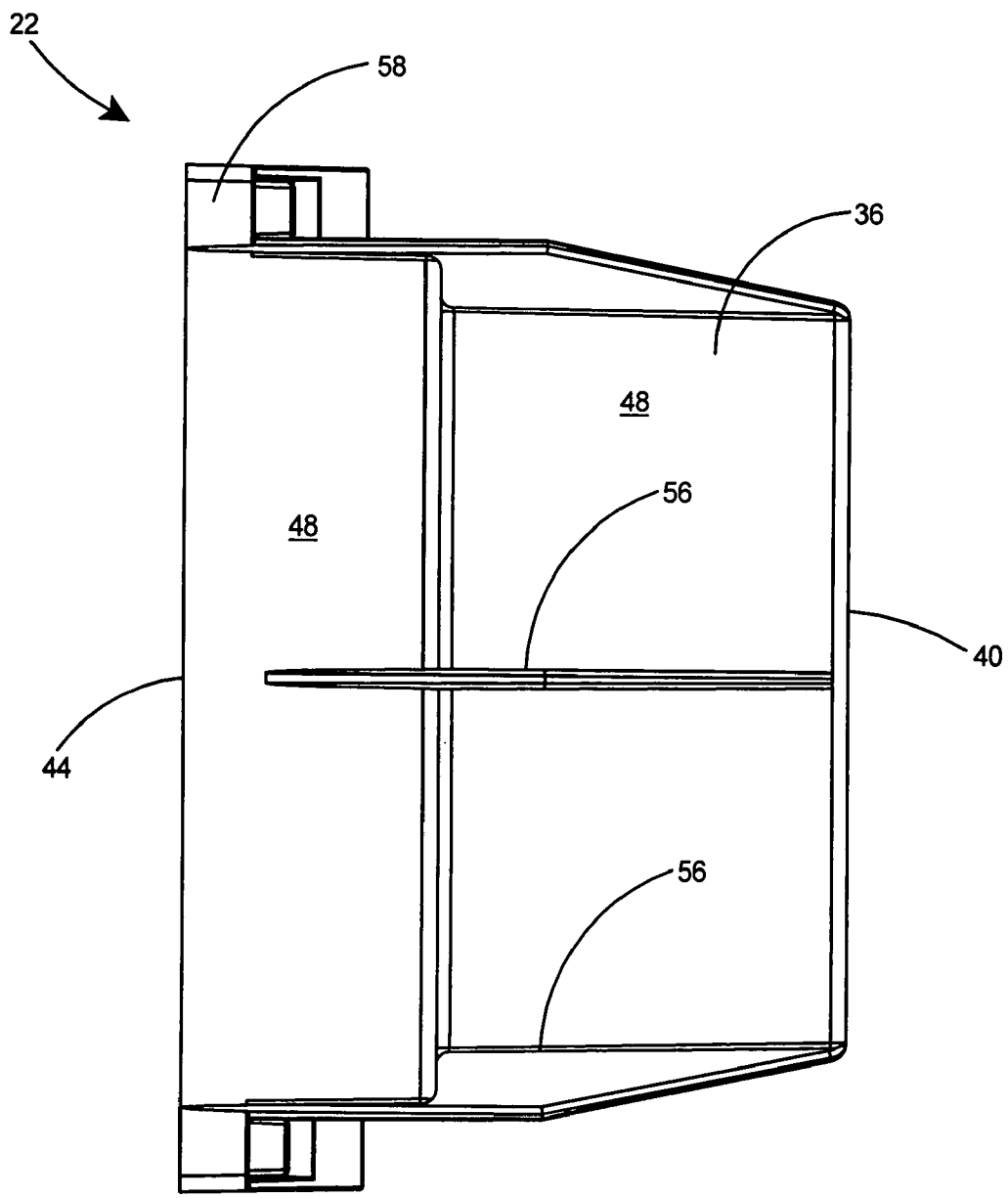
FIG. 4 is a side view of the electrical box as viewed from the right side of FIG. 3.

With reference to FIG. 4, the electrical box includes one or more ribs 56 extending outward from and longitudinally along the outer surface 48 of the vertical sidewalls 36 and a flange 58 extending laterally at the front edge 44 of the sidewalls 36, 38 of the electrical box 22.

Figure 5:
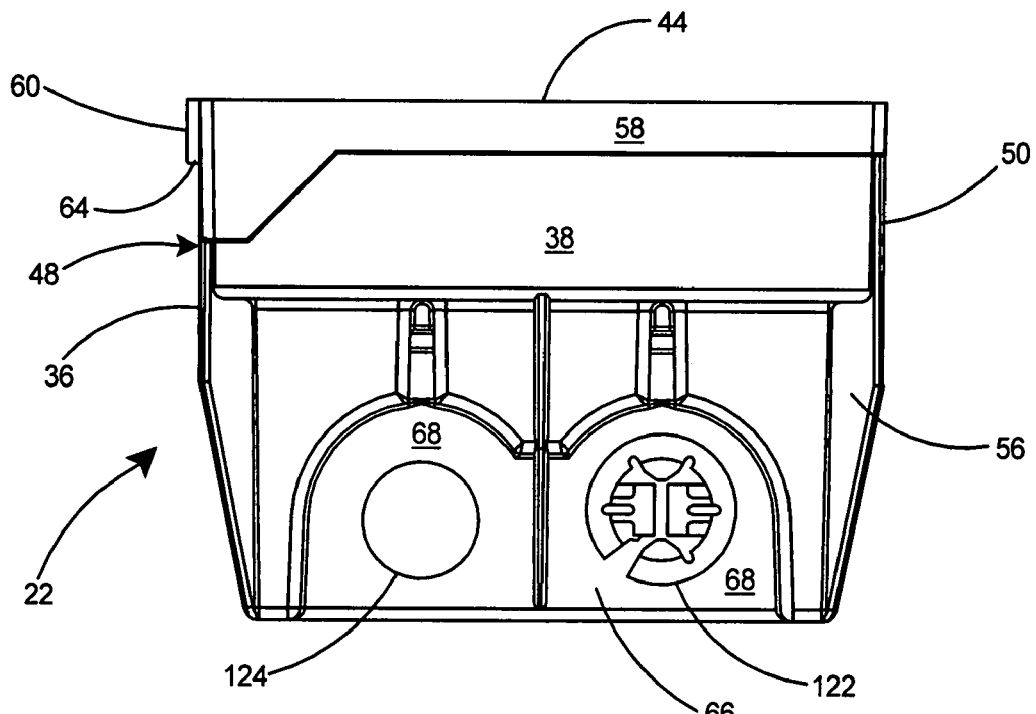
FIG. 5 is a bottom view of the electrical box of FIG. 3.

As shown in FIG. 5, the electrical box 22 includes one or more alignment tabs 60 extending along the outer surface 48 of at least one of the sidewalls 36, 38. The ribs 56 extend rearward from the forward portion 50 of the vertical sidewalls 36 and longitudinally along the vertical sidewalls 36. The ribs 56 include a forward edge 62 that is planar with the vertical sidewalls 36. The alignment tabs 60 include a rear edges 64 that are planar with the front edge 44 of the electrical box 22.

Figure 6:
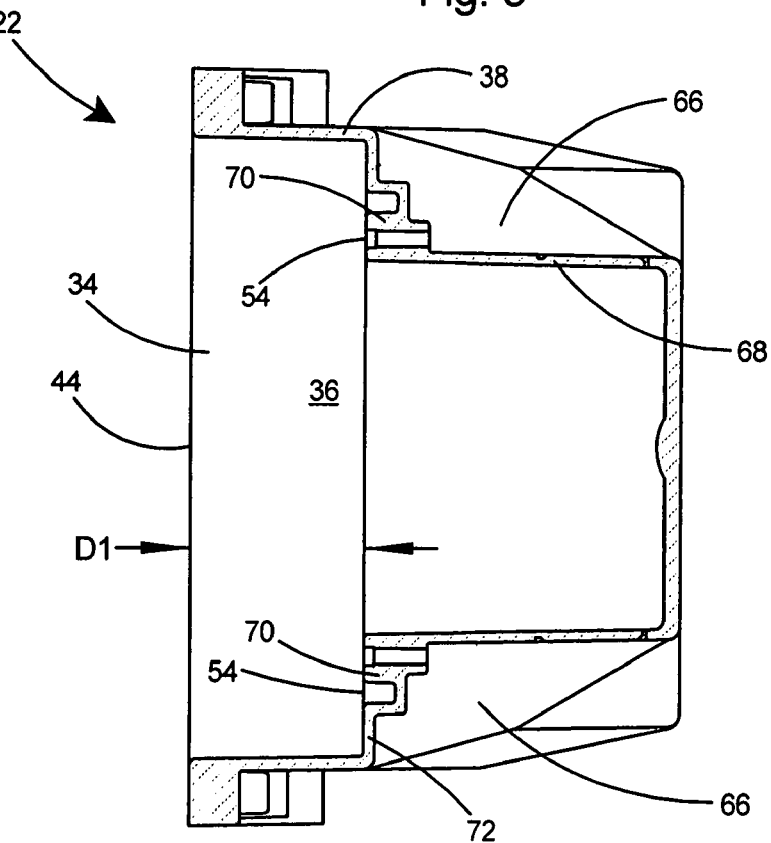
FIG. 6 is a sectional view of the electrical box taken along line 6-6 of FIG. 3.

With reference to FIG. 6, one or more of the opposing sidewalls 36, 38 of the electrical box 22 include one or more recessed areas 66 therein. The recessed areas 66 include a recessed wall 68 thereon. The connection points 54 include bosses 70 molded integrally within the electrical box 22. The connection points 54 are offset a distance D1 rearward from the front edge 44 thereby recessing an electrical device (not shown) by distance D1 from the open front 34 of the electrical box 22. A lateral wall 72 extends between and connects the rearward portion 52 and forward portion 50 of the sidewalls.

Figure 7:
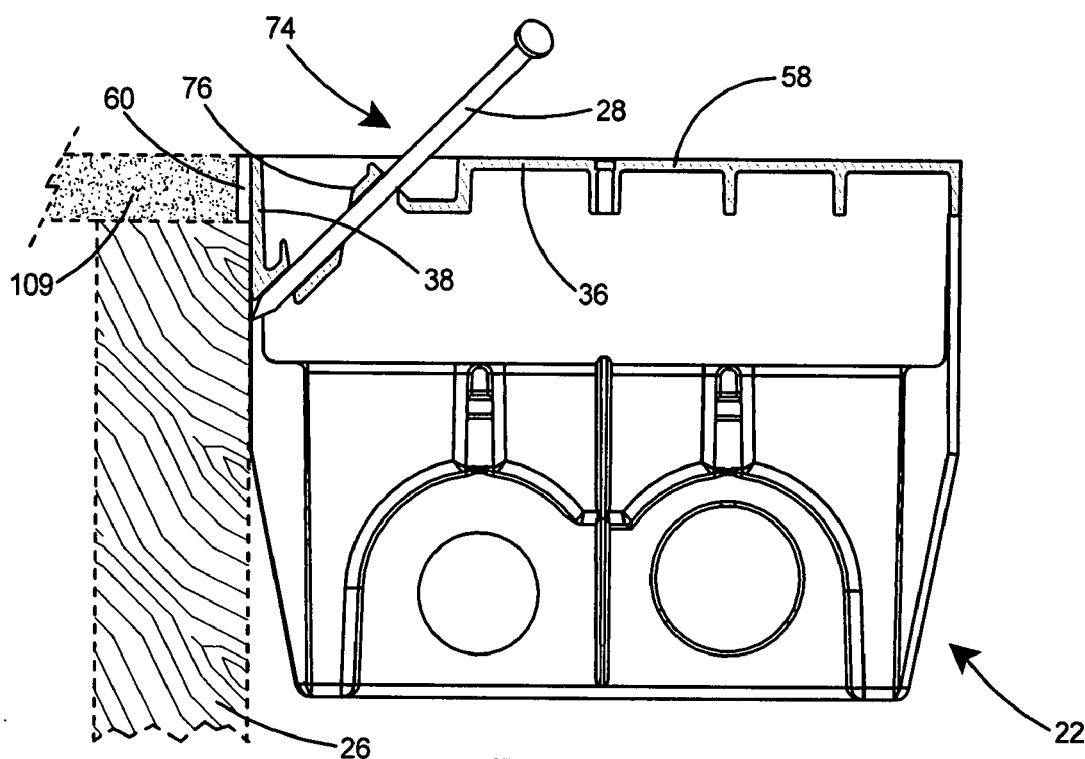
FIG. 7 is a sectional view of the electrical box taken along line 7-7 of FIG. 3.
Figure 8:
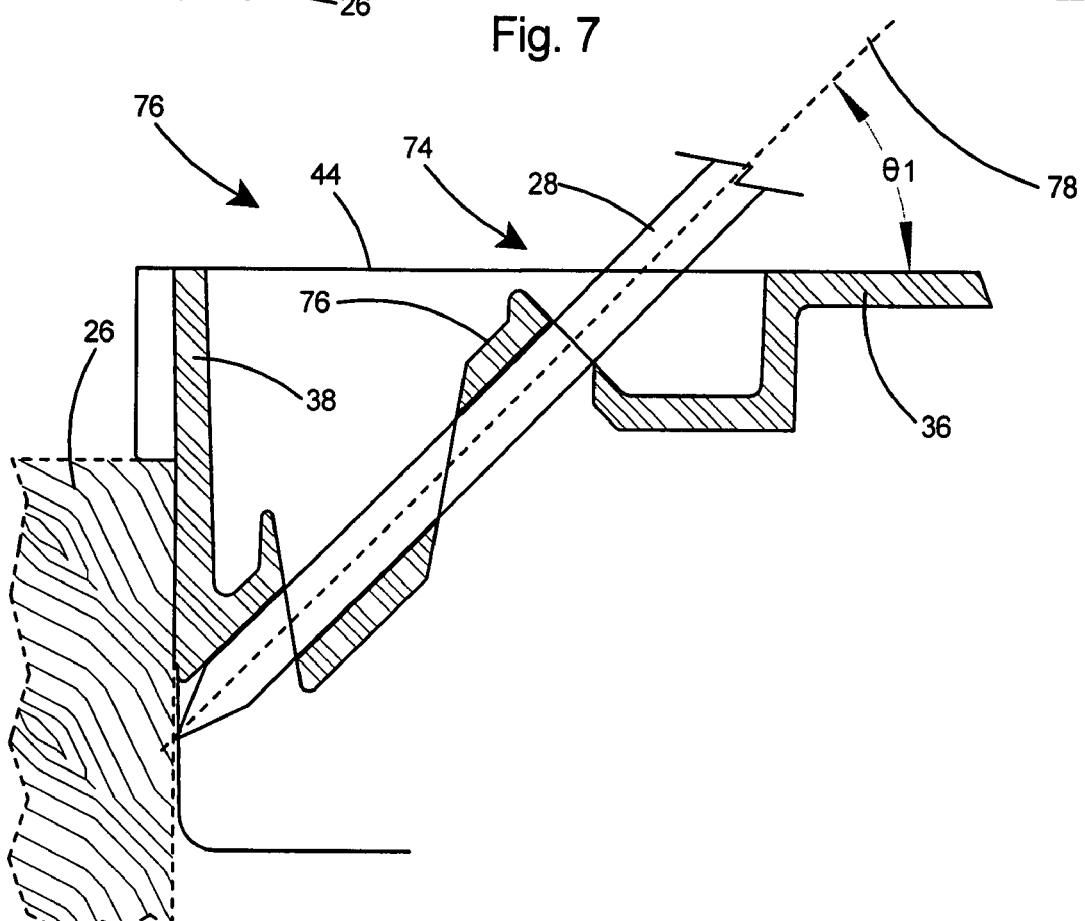
FIG. 8 is detailed view of the nailer portion of the electrical box shown in FIG. 7.

As shown in FIGS. 7 and 8, the recessed electrical box assembly includes a mounting arrangement 74 for securing the electrical box 22 to a stud 26 or similar support. The mounting arrangement 74 includes one or more fastener retaining bosses 76 on the flange 58 of the electrical box 22 and a captive fastener 28 held frictionally within each of the fastener retaining bosses 76. As shown in FIG. 8, the bosses 76 align the captive fasteners 28 along an axis 78. The axial orientation along axis 78 orients the captive fasteners 28 outward of the front edge 44 of the sidewalls 36, 38. The captive fasteners 28 are preferably at an angle θ1 of 35 to 55 degrees with respect to the front edge 44 of the sidewalls 36, 38.

Figure 11A:
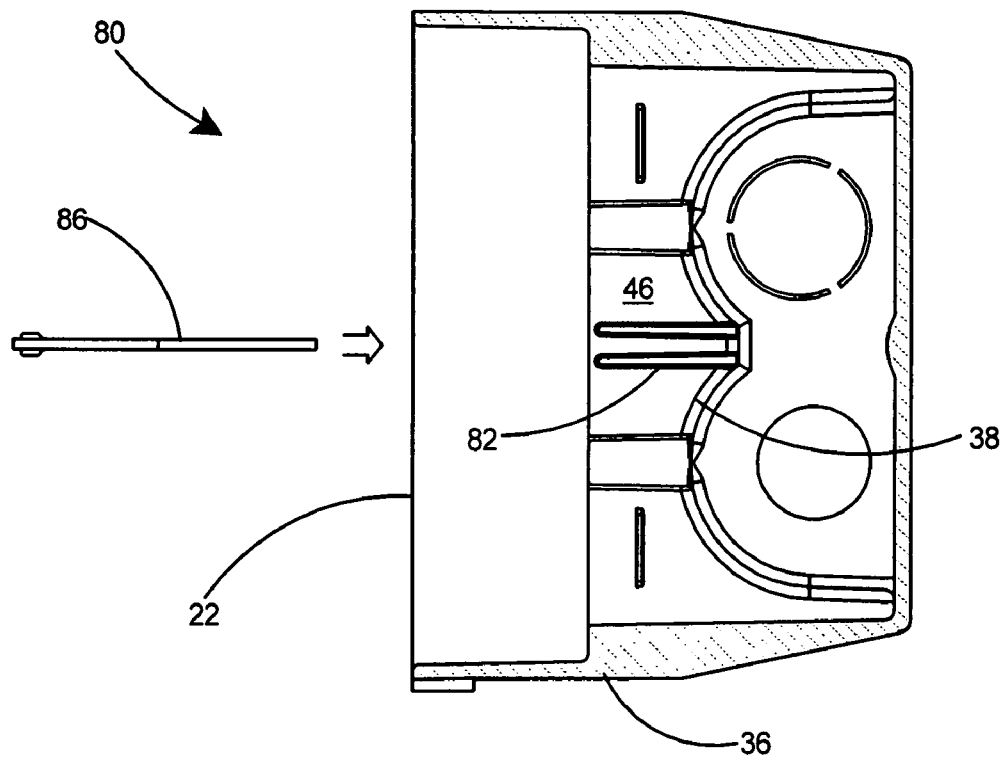
FIG. 11A is a schematic depicting the voltage separator portion of the electrical box assembly of the present invention exploded away from the electrical box and in alignment to be inserted in the electrical box, the view of the electrical box being taken along line 11A-11A of FIG. 3.
Figure 11B:
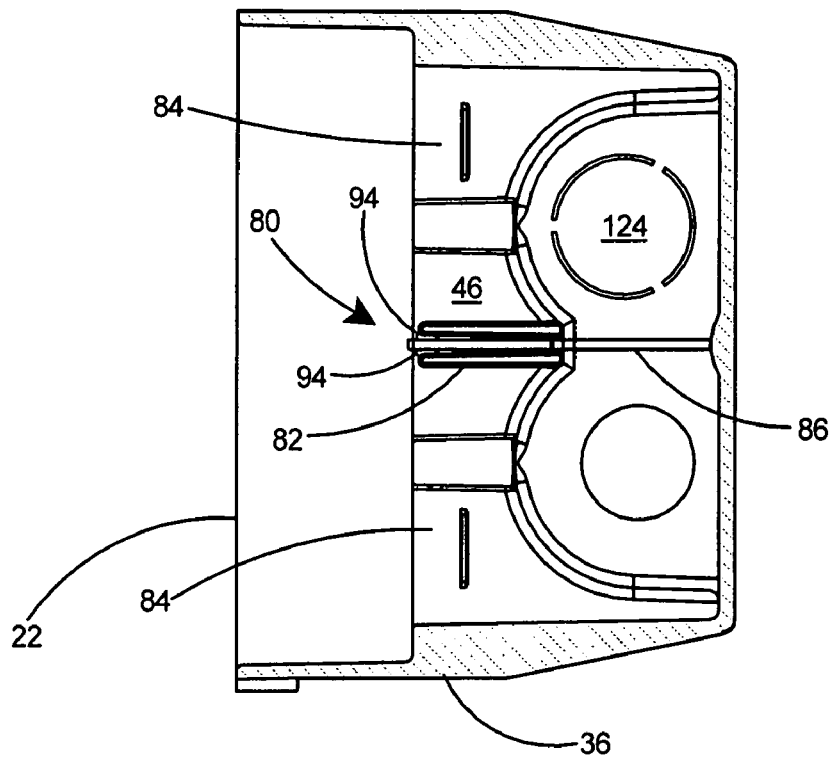
FIG. 11B is a schematic depicting the voltage separator fully installed in the electrical box and dividing the enclosure into high and low voltage compartments.

With reference to FIGS. 11A-11B, the two-gang recessed electrical box assembly of the present invention includes a dividing arrangement 80 for dividing the electrical box 22 into separate high and low voltage enclosures. The dividing arrangement 80 includes a panel 86 and channels 82 on the inner surfaces 46 of opposing horizontal sidewalls 38 of the electrical box 22. Although FIGS. 11A and 11B depict the channels 82 in the horizontal sidewalls 38, it should be understood that the channels could also be formed on the inner surfaces 46 of the vertical sidewalls 36 if preferred. Placing channels 82 on the horizontal sidewalls 38 divides the electrical enclosure 42 into side-by-side smaller enclosures 84 as shown in FIG. 11B. Placing the channels 82 on the vertical sidewalls 36 would divide the electrical enclosure 42 into smaller upper and lower enclosures (not shown). As shown in the sequence depicted in FIGS. 11A and 11B, the dividing arrangement 80 includes a panel 86 that is slid within the channels 82 to divide the electrical enclosure 42 into two smaller enclosures 84. The dividing arrangement 80 divides the electrical box 22 into separate high and low voltage enclosures 84.

As shown in FIGS. 9-12, the panel 86 is substantially T-shaped and includes a main portion 88 having two sides 90 and two wings 92 extending from the main portion 88. Tabs 94 extend from both sides 90 of the wings 92 at their outer corners 96. The tabs 94 provide a thickened cross section that enables the panel 86 to tighten when pushed within the channels 82 to divide the electrical enclosure 42 into two separate enclosures 84 (see FIG. 11B).

Figure 13:
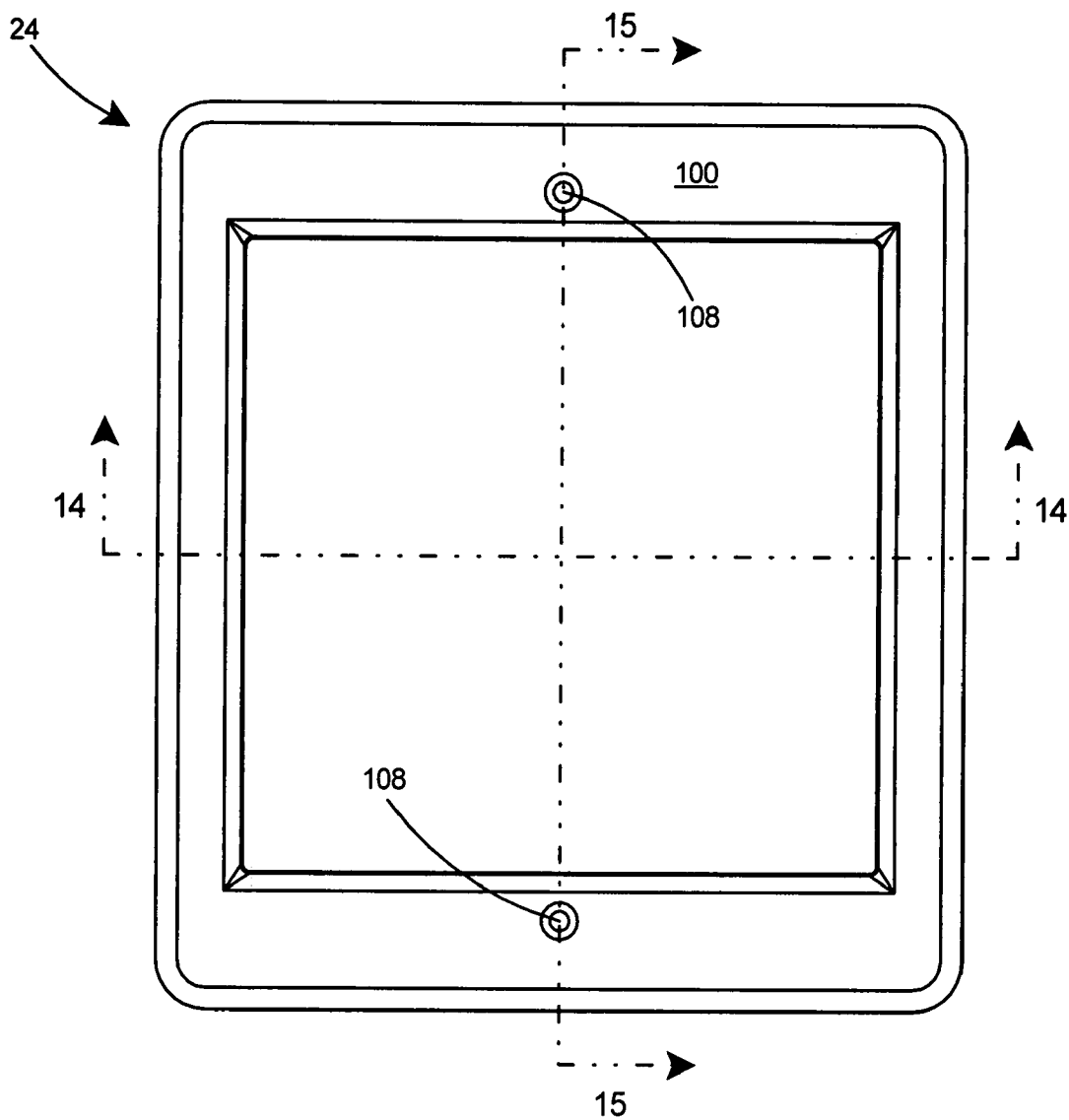
FIG. 13 is a front view of the trim plate portion of the two-gang recessed electrical box assembly of FIG. 1.
Figure 14:
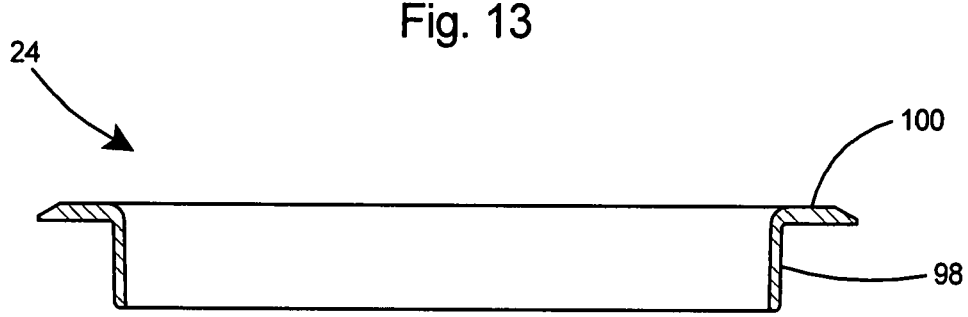
FIG. 14 is a sectional view of the trim plate taken along line 14-14 of FIG. 13.
Figure 15:
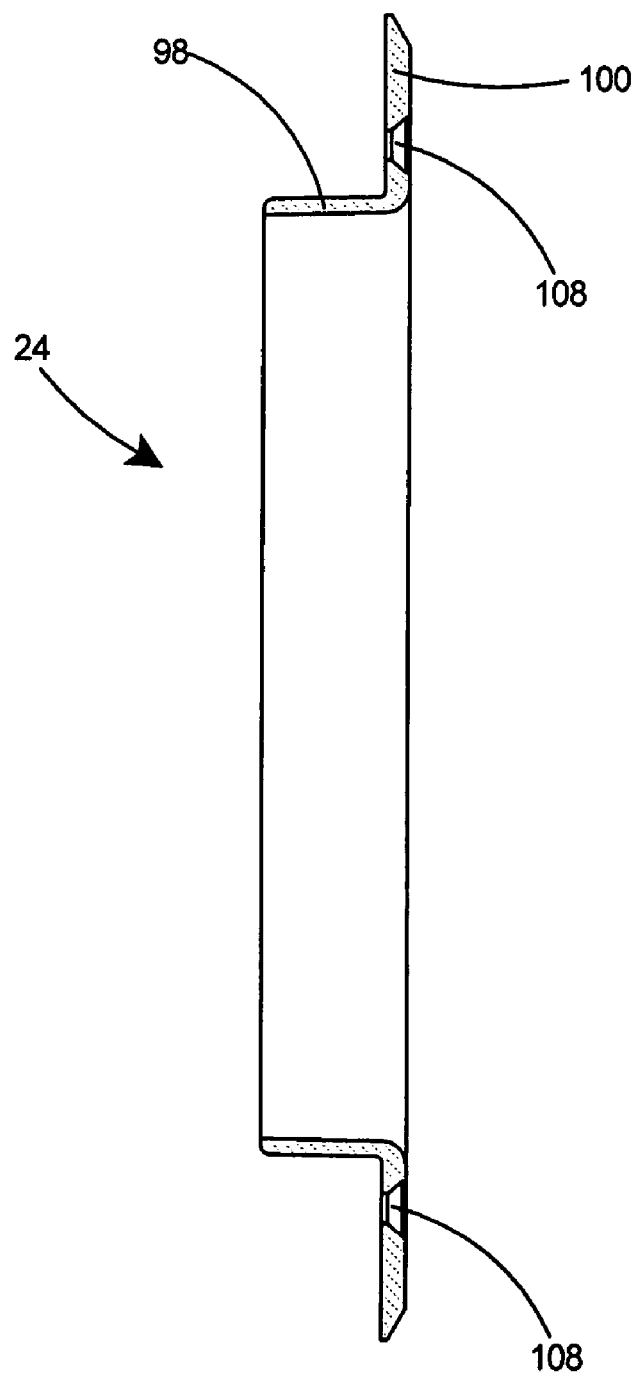
FIG. 15 is a sectional view of the trim plate taken along line 15-15 of FIG. 13.
Figure 16:
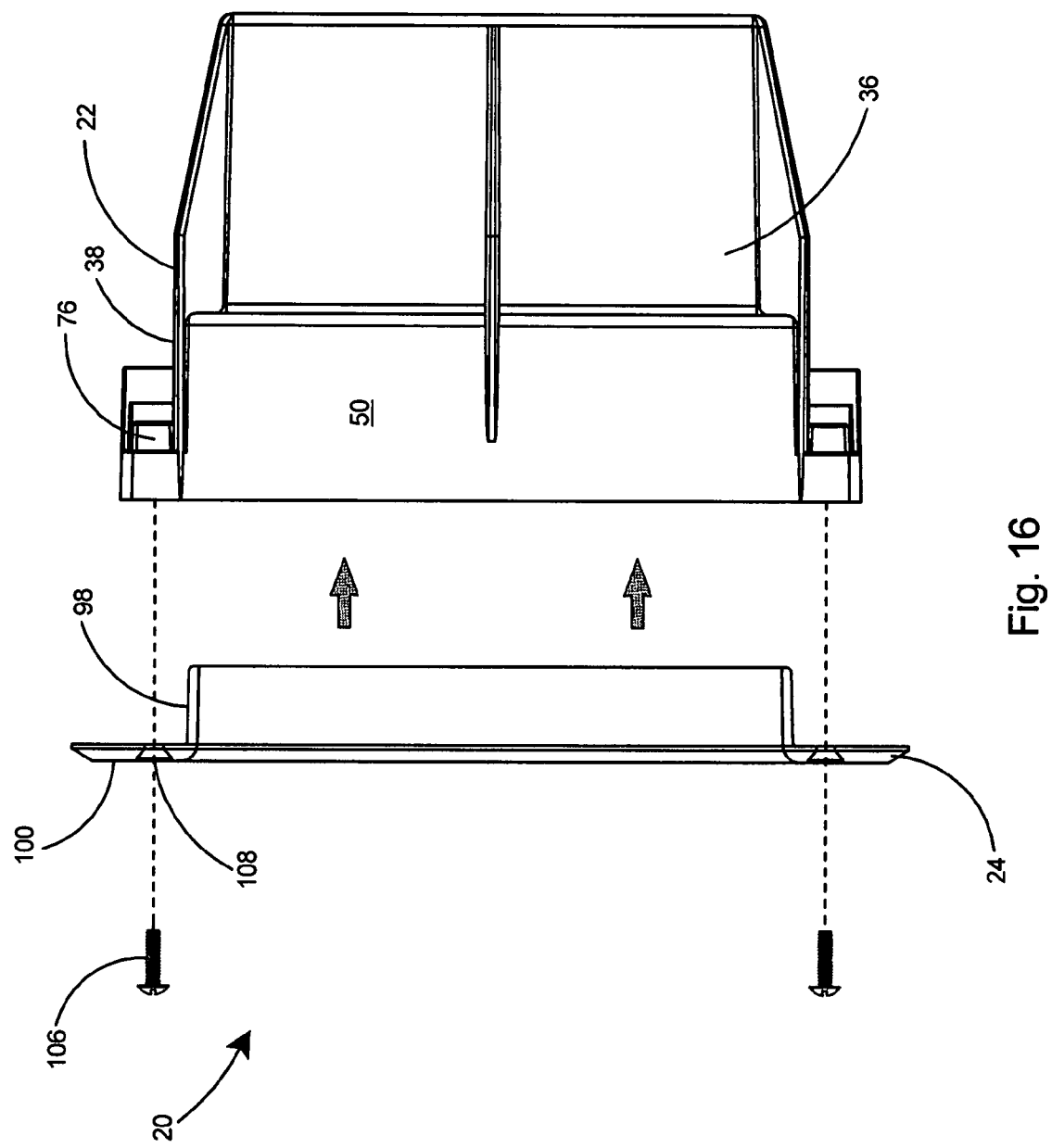
FIG. 16 is an exploded side view depicting the trim plate portion in alignment with the electrical box portion to be joined thereto to form a two-gang recessed electrical box assembly according to the present invention.
Figure 17:
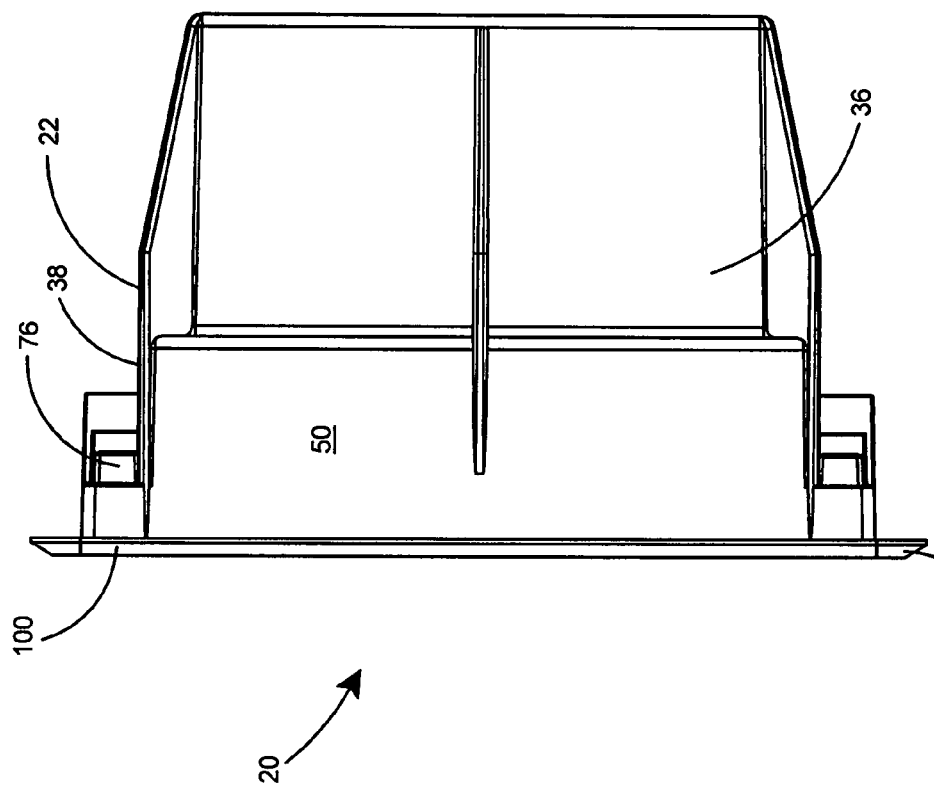
FIG. 17 is a side view similar to FIG. 16 but after the trim plate has been secured to the electrical box.

With reference to FIGS. 13-15, the trim plate 24 is provided with the two-gang recessed electrical box assembly of the present invention to provide an attractive cover for covering the electrical box 22 including the fastener retaining bosses 76 (see FIG. 1). The trim plate includes a peripheral sidewall 98 and a flange 100. As shown in FIGS. 16 and 17, the peripheral sidewall 98 of the trim plate 24 is of a slightly smaller size than the forward portion 50 of the sidewalls 36, 38 of the electrical box 22, thereby enabling the peripheral sidewall 98 of the trim plate 24 to be telescopically received within the forward portion 50 of the sidewalls 36, 38 of the electrical box 22.

Referring to FIG. 1, the two-gang recessed electrical box assembly 20 of the present invention includes a fastening arrangement 102 for securing the trim plate 24 to the electrical box 22. The fastening arrangement 102 includes an aperture 108 in the trim plate 24, a bore 104 in the flange 58 of the electrical box 22, and fasteners 106 for securing through the aperture 108 of the trim plate 24 into the bore 104 of the electrical box 22. The fastening arrangement 102 ensures that the trim plate 24 is secured flush against the front edge 44 of the sidewalls 36, 38 of the electrical box 22.

For understanding the operation of the two-gang recessed electrical box assembly 20 of the present invention, the reader is referred to FIG. 1. The electrical box 22 portion of the electrical box assembly 20 is first aligned with a stud 26 by placing a vertical sidewall 36 against a stud 26 and sliding the electrical box 22 rearward until the rear edge 64 of the alignment tabs 60 (see FIG. 7) are flush against the stud 26. The alignment tabs 60 thereby align the front edge 44 of the electrical box 22 so that the box 22 will be approximately flush with the later installed sheet rock 109 (see FIG. 7). After being placed in alignment by the alignment tabs 60, the electrical box 22 is mounted to the stud 26 by driving the captive fasteners 28 into the stud 26. Up to two electrical components, such as the duplex outlets 30 depicted in FIG. 1, can then be secured to the connection points 54 within the electrical box 22 by fasteners 110. A conventional faceplate 32 is then secured to the electrical components with fasteners 112. The trim plate 24 is secured to the electrical box 22 by the fastening arrangement 102 including trim plate fasteners 106 secured through apertures 108 into the bores 104 in the flange 58 of the electrical box 22 to form the two-gang recessed electrical box assembly 20 of the present invention.

Figure 18:
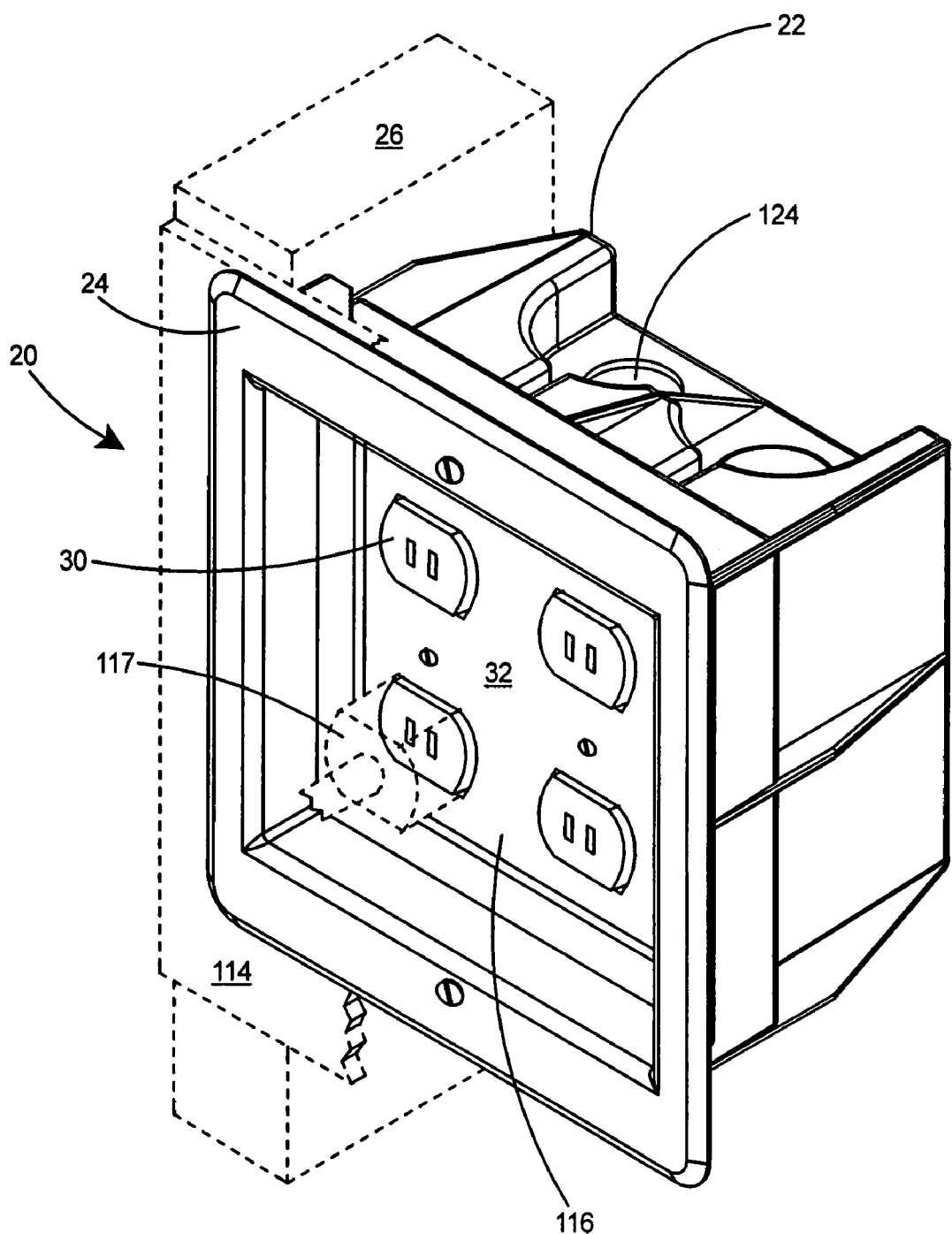
FIG. 18 is a perspective view of the two-gang recessed electrical box assembly of FIG. 1 after the assembly has been secured to a stud, the electrical components installed within the electrical box, and the trim plate has been secured to the electrical box to complete the installation.

The fully installed two-gang recessed electrical box assembly 20 is shown in FIG. 18. The duplex outlets 30 are recessed within the wall 114. The recessed enclosure 116 between the trim plate 24 and the faceplate 32 is large enough to recess the duplex outlets 30 and the conventional plug ends 117 of connected electrical cords within the recessed enclosure 116. The two-gang recessed electrical box assembly 20 therefore protects the plug ends 117 of connected electrical cords from dislodgement.

Figure 19:
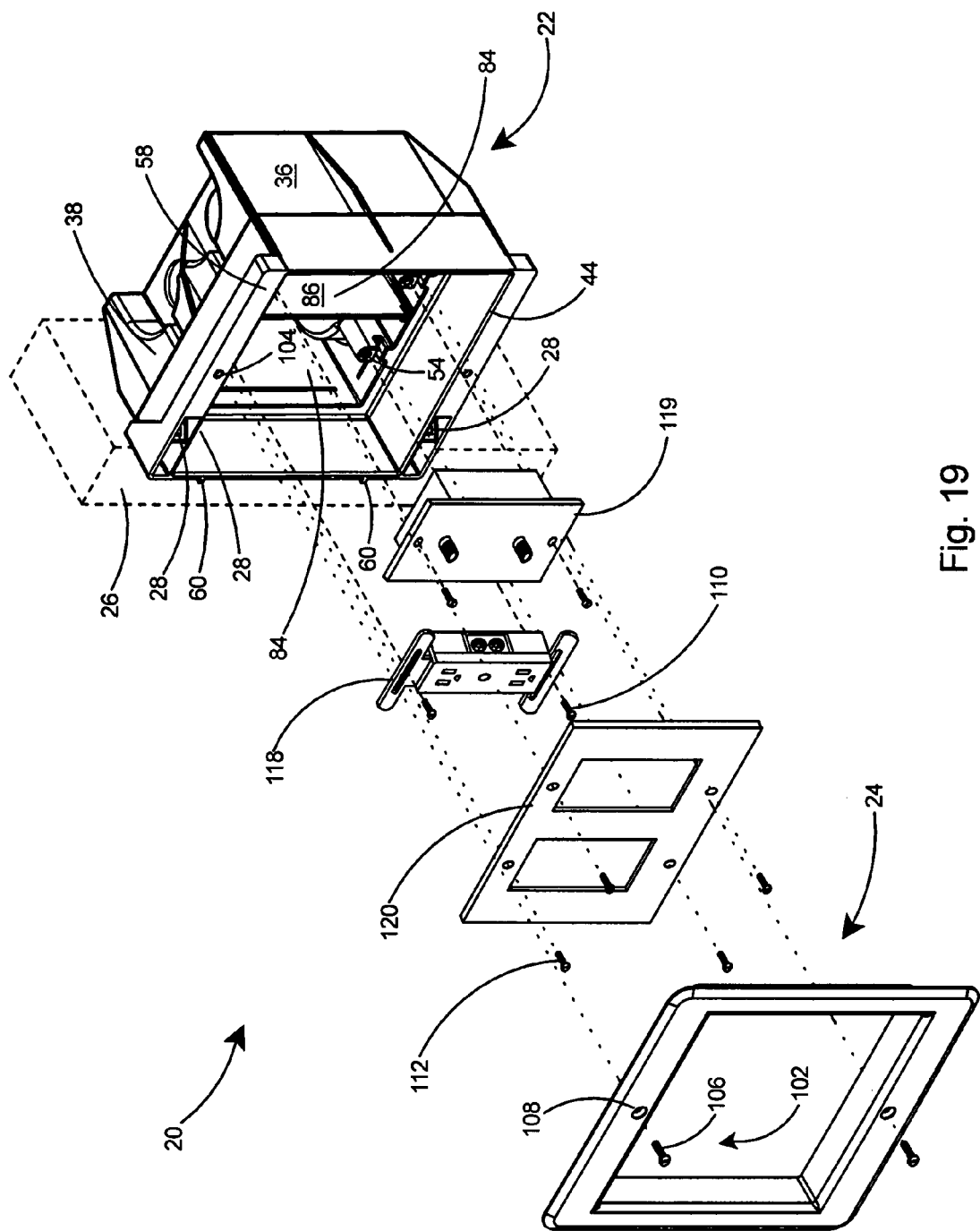
FIG. 19 is an exploded perspective view similar to FIG. 1 but depicting use of the two-gang recessed electrical box assembly for installing separate high and low voltage components.

If desired, the installer can then insert a panel 86, as shown in FIG. 19, to divide the electrical box 22 into separate compartments 84 to accommodate both high voltage electrical components 118, such as the GFCI shown, and low voltage electrical components 119. The panel 86 is simply inserted in the manner shown in FIGS. 11A and 11B, with the tabs 94 securing the panel 86 within the channels 82 of the electrical box 22. As shown in FIG. 19, a high voltage component such as a GFCI receptacle 118 may be installed in one enclosure 84 and a low voltage component such as the standard jacks for broadband cable 119 in the opposite enclosure 84. A complementary Decora-style faceplate 120 and the trim plate 24 are then installed to complete the two-gang recessed electrical box assembly 20. Low voltage components such as jacks for broadband cable, direct TV, surround sound cabling, or phone systems can be installed within the low voltage enclosure.

As shown in FIG. 5, the recessed wall 68 in the electrical box 22 enables the use of electrical fittings or connectors such as the BLACK BUTTONB™ push-in connector 122 for connecting non-metallic cable to the electrical box 22. The BLACK BUTTONB™ push-in connector, available from Arlington Industries of Scranton, Pa., is simply pushed into one of the knockouts 124 provided in the recessed wall 68. The recessed area 66 prevents the push-in connectors 122 from projecting outward from the sidewalls of the electrical box 22 and interfering with placement of the electrical box in locations where space is tightly restricted.

The electrical box 22 and trim plate 24 portions of the two-gang recessed electrical outlet assembly of the present invention are preferably constructed of plastic. In a preferred embodiment, the electrical box 22 and trim plate 24 are each molded in one piece of plastic.

Having thus described the invention with reference to a preferred embodiment, it is to be understood that the invention is not so limited by the description herein but is defined as follows by the appended claims.

What is claimed is:

1. A recessed electrical box assembly comprising:
an electrical box including an open front, two pairs of opposing sidewalls, and a rear wall defining an electrical enclosure therein;
said sidewalls including a forward portion, a rearward portion, an inner surface, an outer surface, and a front edge;
said forward portion of said sidewalls extending wider laterally than said rearward portion of said sidewalls;
a lateral wall extending between said rearward and forward portions of said sidewalls;
a dividing arrangement for dividing said electrical enclosure into two smaller electrical enclosures;
said dividing arrangement including a channel on said inner surface of a first pair of said opposing sidewalls;
said dividing arrangement including a panel for sliding within said channel;
connection points for securing an electrical device in one or both of said smaller electrical enclosures; and
said connection points offset a distance rearward from said front edge of said sidewalls, whereby said offset distance recesses the electrical devices from said open front of said electrical box.

2. The recessed electrical box assembly of claim 1 including
said two pairs of opposing sidewalls including vertical sidewalls; and
one or more ribs extending outward from and longitudinally along said outer surface of said vertical sidewalls.

3. The recessed electrical box assembly of claim 2 including one or more alignment tabs extending along said outer surface of at least one of said vertical sidewalls, said alignment tabs extending rearward from said front edge of said electrical box.

4. The recessed electrical box assembly of claim 3 wherein
said alignment tabs include a rear edge; and
said rear edges of said alignment tabs are planar with said front edge of said electrical box.

5. The recessed electrical box assembly of claim 1 including a trim plate for securing to said open front of said electrical box.

6. The recessed electrical box assembly of claim 5 including
a flange extending laterally from said front edge of said sidewalls of said electrical box; and
a fastening arrangement for securing said trim plate to said electrical box.

7. The recessed electrical box assembly of claim 6 wherein said fastening arrangement includes
an aperture in said trim plate;
a bore in said flange of said electrical box; and
a fastener for securing through said aperture of said trim plate into said bore of said electrical box whereby said trim plate is secured flush against said front edge of said sidewalls of said electrical box.

8. The recessed electrical box assembly of claim 5 wherein
said trim plate includes a peripheral sidewall and a flange; and
said peripheral sidewall of said trim plate is of a slightly smaller size than said forward portion of said sidewalls of said electrical box, said peripheral sidewall of said trim plate thereby capable of being telescopically received within said forward portion of said sidewalls of said electrical box.

9. The recessed electrical box assembly of claim 1 wherein one or more of said opposing sidewalls include one or more recessed areas therein, said recessed areas including a recessed peripheral wall.

10. The recessed electrical box assembly of claim 1 wherein said connection points include bosses molded integrally within said electrical box.

11. The recessed electrical box assembly of claim 1 including a mounting arrangement for securing said electrical box to a stud.

12. The recessed electrical box assembly of claim 11 wherein said mounting arrangement includes
one or more fastener retaining bosses on said flange of said electrical box; and
a captive fastener held frictionally within each of said fastener retaining bosses.

13. The recessed electrical box assembly of claim 12 wherein
said captive fasteners include an axial orientation; and
said axial orientation orients said captive fasteners outward of said front edge of said sidewalls.

14. The recessed electrical box assembly of claim 13 wherein said captive fasteners are at an angle of between 5 and 15 degrees with respect to said front edge of said electrical box.

15. The recessed electrical box assembly of claim 1 wherein
said panel includes two sides and outer corners; and
said panel includes tabs extending outward from said sides of said panel at said outer corners.

* * * * *